US008718098B2

(12) United States Patent
Zhang et al.

(10) Patent No.: US 8,718,098 B2
(45) Date of Patent: May 6, 2014

(54) METHOD FOR COMPRESSING AND DECOMPRESSING TIME STAMP AND EQUIPMENT THEREOF

(75) Inventors: Jian Zhang, Shenzhen (CN); Xuehong Shi, Shenzhen (CN); Wenyong Bi, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 146 days.

(21) Appl. No.: 13/502,609

(22) PCT Filed: Apr. 23, 2010

(86) PCT No.: PCT/CN2010/072149
§ 371 (c)(1),
(2), (4) Date: Apr. 18, 2012

(87) PCT Pub. No.: WO2010/145327
PCT Pub. Date: Dec. 23, 2010

(65) Prior Publication Data
US 2012/0213234 A1   Aug. 23, 2012

(30) Foreign Application Priority Data

Oct. 20, 2009   (CN) .......................... 2009 1 0205523

(51) Int. Cl.
*H04J 3/18*        (2006.01)
(52) U.S. Cl.
USPC ....................................................... 370/477
(58) Field of Classification Search
USPC ......... 370/252, 349, 392, 468, 474, 476, 477, 370/498, 521; 375/240, 240.25, 240.26, 375/240.27; 708/203; 714/746, 799
See application file for complete search history.

(56) References Cited

U.S. PATENT DOCUMENTS

| 5,321,397 A | 6/1994 | Stone |
| 5,633,871 A | 5/1997 | Bloks |
| 2004/0126026 A1* | 7/2004 | He .............................. 382/239 |

FOREIGN PATENT DOCUMENTS

| EP | 1204258 A2 | 5/2002 |
| WO | 2007112140 A2 | 10/2007 |

OTHER PUBLICATIONS

Bormann,C.et al. Robust Header Compression (ROHC) [s].IETF RFC3095, Category:Standards Track, Jul. 31, 2001 p. 25, line 15 to p. 85, line 26.
International Search Report for PCT/CN2010/072149 dated May 17, 2010.
L-E. Jonsson et al., "ROHC Implementer's Guide"; Network working Group, Apr. 4, 2005, XP 15038895A, see pp. 1-23.

* cited by examiner

*Primary Examiner* — Edan Orgad
*Assistant Examiner* — Saumit Shah
(74) *Attorney, Agent, or Firm* — Ling Wu; Stephen Yang; Ling and Yang Intellectual Property

(57) ABSTRACT

A method and apparatus for compressing and decompressing a time stamp is provided, applied in a scenario of compressing a basic compression packet carrying an extended compression packet of type 3 in Robust Header Compression (ROHC). The compression method comprises: storing high bits of a time stamp to be transmitted in a time stamp field of the basic compression packet; storing bits of successive zeros beginning from the highest bit of the remaining bits of the time stamp to be transmitted after removing said high bits in the extended compression packet in a form of number information; and storing the remaining bits of the time stamp to be transmitted after removing said high bits and said bits of successive zeros in the time stamp field of the extended compression packet as low bits. Therefore the compression space can be effectively used and compression efficiency can be improved.

14 Claims, 3 Drawing Sheets

METHOD FOR COMPRESSING AND DECOMPRESSING TIME STAMP AND EQUIPMENT THEREOF

TECHNICAL FIELD

The present invention relates to the field of mobile communications, and in particular, to a robust header compression and decompression method and apparatus.

BACKGROUND OF THE RELATED ART

Due to constraints of physical conditions, compared to the wired link, the wireless link in the mobile communication system has a low transmission rate, and a high bit error rate. In order to effectively make use of limited radio channel bandwidth resources, the Robust Header Compression (ROHC) is introduced. The main idea of the ROHC is to transparently compress and decompress information in the header of the packet between directly connected nodes by using information redundancy between service stream packets.

At present, the ROHC supports for compression and decompression of packet data packets of the types of Internet Protocol (IP)/User Datagram Protocol (UDP)/Real-time Transport Protocol (RTP), IP/UDP, IP/Encapsulating Security Payload (ESP). When the packet of IP/UDP/RTP type is compressed, a time stamp field in the RTP protocol is an important field to be compressed. At present, in the RFC3095 protocol, compression methods such as scaling compression, time-based compression and Self-Describing Variable-Length (SDVL) encoding etc. are provided.

The SDVL encoding method refers to representing a length of the encoded field using a number of high bits of the first byte. If the highest bit of the first byte is 0, it is indicated that the length of the encoded field is 1 byte, and the maximum compressible value is 127; if the highest two bits of the first byte are 10, it is indicated that the length of the encoded field is 2 bytes, and the maximum compressible value is 16383; if the highest three bits of the first byte are 110, it is indicated that the length of the encoded field is 3 bytes, and the maximum compressible value is 2097151; and if the highest three bits of the first byte are 111, it is indicated that the length of the encoded field is 4 bytes, and the maximum compressible value is 536870911.

The RFC3095 protocol defines a basic compression packet type and an extended compression packet type, and when the basic compression packet is insufficient to carry the corresponding compression information, an extended compression packet can be added behind the basic compression packet. The extended compression packet can be divided into extended type 1, extended type 2 and extended type 3.

When the basic compression packet carries an extended compression packet of type 3, the RFC3095 stipulates to store high bits of the time stamp field in the basic compression packet, and the low bits are performed with SDVL encoding and then are put into the extended compression packet. When the binary representation of the time stamp is more than 29 bits, and the field value stored in the extended compression packet begins with zero, it is needed to use up all storage space related to the time stamp in the basic compression packet and the extended compression packet when using the SDVL encoding. The current processing mechanism has the following defects:

There may be a plurality of bits of successive zeros in the extended compression packet, which wastes the storage space of the compression packet, has relatively low compression efficiency, and occupies more radio bandwidth resources.

A particular processing is needed when using the SDVL encoding in the extended compression packet.

SUMMARY OF THE INVENTION

The technical problem to be solved by the present invention is to provide a compression and decompression methods and apparatuses of a time stamp, which can efficiently use a compression space and enhance the compression efficiency.

In order to solve the above technical problem, the present invention provides a method for compressing a time stamp, applied in a scenario of compressing a basic compression packet carrying an extended compression packet of type 3 in Robust Header Compression (ROHC), and the method comprises:

storing high bits of a time stamp to be transmitted in a time stamp field of the basic compression packet;

storing bits of successive zeros beginning from the highest bit of remaining bits of the time stamp to be transmitted after removing high bits in the extended compression packet in a form of number information; and storing remaining bits of the time stamp to be transmitted after removing the high bits and the bits of successive zeros in a time stamp field of the extended compression packet as low bits.

The above method may have the following features:

before the step of storing the high bits, the method further comprises:

pre-setting a control bit (CTRLBIT) in the time stamp field of the basic compression packet to indicate an encoding mode; and setting a zero bit indication filed in the time stamp field of the extended compression packet to indicate the number information of the bits of successive zeros;

after the step of storing the high bits, the method further comprises:

counting and determining whether the number information is larger than a threshold of a particular encoding mode;

and if the number information is larger than the threshold of the particular encoding mode, setting the CTRLBIT as a value indicating the particular encoding mode;

and wherein, storing bits of successive zeros in the extended compression packet in a form of number information is specifically storing the bits of successive zeros in the zero bit indication field of the extended compression packet;

and if the number information is not larger than the threshold of the particular encoding mode, setting the CTRLBIT as a value indicating a general encoding mode; and storing the remaining bits of the time stamp to be transmitted after removing the high bits in the time stamp field of the extended compression packet as low bits.

The above method may have the following features:

the CTRLBIT is in a form of 2 bits, to indicate the general encoding mode and the particular encoding mode, and to further indicate a grouping mode for the bits of successive zeros when indicating the particular encoding mode;

the number information of the bits of successive zeros indicated by the zero bit indication field is group number information;

after determining that the number information is larger than the threshold of the particular encoding mode, the method further comprises:

determining the grouping mode for the particular encoding mode, and setting the CTRLBIT as a value representing the determined grouping mode; and the grouping mode is a mode, among grouping modes indicated by the CTRLBIT, of which each group has the same number of bits and the number of the groups is a minimum value for the bits of successive zeros, and storing the bits of successive zeros in a form of number information is storing a group number obtained by grouping the bits of successive zeros according to the grouping mode in the zero bit indication field of the extended compression packet.

The above method may have the following features:

the grouping mode comprises each group with 1 bit of zero, each group with 2 bits of zeros, and each group with three bits of zeros.

The above method may have the following features:

the CTRLBIT is in a form of 1 bit, to indicate the general encoding mode and the particular encoding mode with 0 or 1 respectively;

the number information of the bits of successive zeros indicated by the zero bit indication field is bit number information;

after determining that the number information is larger than the threshold of the particular encoding mode, the method further comprises: setting the CTRLBIT as a value representing the particular encoding mode;

storing in a form of number information is directly storing the number of the bits of successive zeros in the zero bit indication field of the extended compression packet.

The above method may have the following features:

storing the high bits of the time stamp to be transmitted in the time stamp field of the basic compression packet is specifically performed as that: using the bits in the time stamp field to be transmitted with a number equal to the number of bits of the time stamp field in the basic compression packet beginning from the highest bit minus the number of bits occupied by the CTRLBIT as high bits of the time stamp field to be transmitted.

The above method may have the following features:

after storing the low bits in the time stamp field of the extended compression packet, the method further comprises: padding unoccupied bits in the time stamp field of the extended compression packet with zeros, and then using Self-Describing Variable-Length (SDVL) encoding for the whole extended compression packet.

In order to solve the above technical problem, the present invention further provides a method for decompressing a time stamp, applied in a scenario of decompressing a basic compression packet carrying an extended compression packet of type 3 in Robust Header Compression (ROHC), and the method comprises:

setting a control bit (CTRLBIT) in a time stamp field of the basic compression packet, to indicate an encoding mode; and setting a zero bit indication field in a time stamp field of the extended compression packet, to indicate number information of bits of successive zeros;

parsing and determining the CTRLBIT in the time stamp field of the basic compression packet when decompressing the compression packet, if a value of the CTRLBIT is a value indicating a particular encoding mode, parsing the zero bit indication field in the time stamp field of the extended compression packet and accordingly obtaining the number of bits of successive zeros, parsing out the stored bits of the time stamp from the time stamp field of the basic compression packet as high bits, parsing out the stored bits of the time stamp from the time stamp field of the extended compression packet as low bits, padding bits of zeros with a number equal to the number of the bits of successive zeros between the high bits and the low bits, so as to obtain a time stamp which is finally obtained by decompression; and if the value of the CTRLBIT is a value indicating a general encoding mode, parsing out the stored bits of the time stamp from the time stamp field of the basic compression packet as high bits, and parsing out the stored bits of the time stamp from the time stamp field of the extended compression packet as low bits, so as to obtain the time stamp which is finally obtained by decompression.

The above method may have the following features:

the CTRLBIT is in a form of 2 bits, to indicate the general encoding mode and the particular encoding mode, and to further indicate a grouping mode for the bits of successive zeros when indicating the particular encoding mode;

the number information of the bits of successive zeros indicated by the zero bit indication field is group number information;

after determining that the value of the CTRLBIT is a value indicating the particular encoding mode, the method further comprises: determining a grouping mode indicated by the value of the CTRLBIT, parsing the zero bit indication field in the time stamp field of the extended compression packet to obtain group number information, and computing the number of the bits of successive zeros according to the grouping mode and the group number information.

The above method may have the following features:

the grouping mode comprises each group with 1 bit of zero, each group with 2 bits of zeros, and each group with three bits of zeros; and computing the number of the bits of successive zeros according to the grouping mode and the group number information refers to computing a product of the number of bits of zeros included in each group and the group number.

The above method may have the following features:

the CTRLBIT is in a form of 1 bit, to indicate the general encoding mode and the particular encoding mode with 0 or 1 respectively;

the number information of the bits of successive zeros indicated by the zero bit indication field is bit number information;

the value obtained by parsing the zero bit indication field in the time stamp field of the extended compression packet when the value of the CTRLBIT is the value indicating the particular encoding mode is the number of the bits of the successive zeros.

The above method may have the following features:

before parsing the zero bit indication field, the method further comprises performing Self-Describing Variable-Length (SDVL) encoding on the whole extended compression packet.

In order to solve the above technical problem, the present invention further provides an apparatus for compressing a time stamp, applied in a scenario of compressing a basic compression packet carrying an extended compression packet of type 3 in Robust Header Compression (ROHC), the apparatus comprising a counting module and a compression processing module, wherein, the counting module is configured to count the number of bits of successive zeros beginning from the highest bit of remaining bits of a time stamp to be transmitted after removing high bits, and transmitting the number of bits to the compression processing module;

the compression processing module is configured to:

store the high bits of the time stamp to be transmitted to a time stamp field of the basic compression packet, and store the bits of successive zeros in a zero bit indication field of the extended compression packet in a form of number information according to the number of bits received by the counting module; and store remaining bits of the time stamp to be transmitted after removing the high bits and the bits of successive zeros as low bits in the time stamp field of the extended compression packet.

The above apparatus may have the following features:

further comprising a configuration module;

the configuration module is configured to: set a control bit (CTRLBIT) and a corresponding relationship between a value of the CTRLBIT and an encoding mode indicated by the CTRLBIT in the time stamp field of the basic compression packet; and set the zero bit indication field in the time stamp field of the extended compression packet, wherein, the zero bit indication field is used to indicate the number information of the bits of successive zeros;

the compression processing module is further configured to:

after receiving the number of bits of successive zeros transmitted by the counting module, determine whether the number of bits is larger than a threshold of a particular encoding mode, and and if the number of bits is larger than the threshold of the particular encoding mode, set the CTRLBIT as a value indicating the particular encoding mode, and wherein, according to the number of bits of successive zeros, storing the bits of successive zeros in a form of number information is storing the bits of successive zeros in the zero bit indication field of the extended compression packet;

and if the number of bits is not larger than the threshold of the particular encoding mode, set the CTRLBIT as a value indicating a general encoding mode, and storing the remaining bits of the time stamp to be transmitted after removing the high bits in the time stamp field of the extended compression packet as low bits.

The above apparatus may have the following features:

the configuration module is configured to: configure the CTRLBIT to be represented in a form of 2 bits, to indicate the general encoding mode and the particular encoding mode, and to further indicate a grouping mode for the bits of successive zeros when indicating the particular encoding mode; and configure the number information of the bits of successive zeros indicated by the zero bit indication field to be group number information;

the compression processing module is further configured to:

after determining that the number of bits is larger than the threshold of the particular encoding mode, determine a grouping mode indicated by the CTRLBIT, and setting the CTRLBIT to represent a value of the determined grouping mode; and the grouping mode is a mode of each group with the same number of bits and the number of the groups with a minimum for the bits of successive zeros, and store the number of groups obtained by grouping the bits of successive zeros according to the grouping mode in the zero bit indication field of the extended compression packet.

The above apparatus may have the following features:

the grouping mode configured by the configuration module comprises each group with 1 bit of zero, each group with 2 bits of zeros, and each group with three bits of zeros.

The above apparatus may have the following features:

the configuration module is configured to configure the CTRLBIT to be represented in a form of 1 bit, to indicate the general encoding mode and the particular encoding mode with 0 or 1 respectively; the number information of the bits of successive zeros indicated by the zero bit indication field is bit number information.

The compression processing module is configured to use the bits in the time stamp field to be transmitted with a number equal to the number of bits of the time stamp field in the basic compression packet beginning from the highest bit minus the number of bits occupied by the CTRLBIT as high bits of the time stamp field to be transmitted, when storing the high bits of the time stamp to be transmitted in the time stamp field of the basic compression packet.

The above apparatus may have the following features:

the compression processing module is further configured to, after storing the low bits of the time stamp to be transmitted in the time stamp field of the extended compression packet, pad unoccupied bits in the time stamp field of the extended compression packet with zeros, and then use Self-Describing Variable-Length (SDVL) encoding for the whole extended compression packet.

In order to solve the above technical problem, the present invention also provides an apparatus for decompressing a time stamp, applied in a scenario of decompressing a basic compression packet carrying an extended compression packet of type 3 in Robust Header Compression (ROHC), the apparatus comprising a configuration module and a decompression processing module, wherein, the configuration module is configured to:

set a control bit (CTRLBIT) and a corresponding relationship between a value of the CTRLBIT and an encoding mode indicated by the CTRLBIT in a time stamp field of the basic compression packet; and set a zero bit indication field in the time stamp field of the extended compression packet, wherein, the zero bit indication field is used to indicate number information of bits of successive zeros;

the decompression processing module is configured to:

parse and determine the CTRLBIT in the time stamp field of the basic compression packet according to configuration in the configuration module, if a value of the CTRLBIT is a value indicating a particular encoding mode, parse a zero bit indication field in the time stamp field of the extended compression packet and accordingly obtain the number of the bits of successive zeros, parse out the stored bits of the time stamp from the time stamp field of the basic compression packet as high bits, parse out the stored bits of the time stamp from the time stamp field of the extended compression packet as low bits, pad bits of zeros with a number equal to the number of the bits of successive zeros between the high bits and the low bits, so as to obtain a time stamp which is finally obtained by decompression; and if the value of the CTRLBIT is a value indicating a general encoding mode, parse out the stored bits of the time stamp from the time stamp field of the basic compression packet as high bits, and parse out the stored bits of the time stamp from the time stamp field of the extended compression packet as low bits, so as to obtain the time stamp which is finally obtained by decompression.

The above apparatus may have the following features:

the configuration apparatus is further configured to: configure the CTRLBIT to be represented in a form of 2 bits, to indicate the general encoding mode and the particular encoding mode, and to further indicate a grouping mode for the bits of successive zeros when indicating the particular encoding mode; and configure the number information of the bits of successive zeros indicated by the zero bit indication field to be group number information;

the decompression processing module is further configured to, after determining that the value of the CTRLBIT is a value indicating the particular encoding mode, determine a grouping mode indicated by the value of the CTRLBIT, parse the zero bit indication field in the time stamp field of the extended compression packet to obtain group number information, and compute the number of bits of successive zeros according to the grouping mode and the group number information.

The above apparatus may have the following features:

the grouping mode comprises each group with 1 bit of zero, each group with 2 bits of zeros, and each group with three bits of zeros; and the decompression processing module is configured to compute a product of the number of bits of zeros included in each group and the group number when computing the number of bits of successive zeros according to the grouping mode and the group number information.

The above apparatus may have the following features:

the configuration module is further configured to: configure the CTRLBIT to be represented in a form of 1 bit, to indicate the general encoding mode and the particular encoding mode with 0 or 1 respectively; the number information of the bits of successive zeros indicated by the zero bit indication field is bit number information;

the decompression processing module is configured to, after determining that the value of the CTRLBIT is a value indicating the particular encoding mode, parse the zero bit indication field in the time stamp field of the extended compression packet to obtain a value, and the value is the number of the bits of the successive zero.

The above apparatus may have the following features:

the decompression processing module is further configured to first perform Self-Describing Variable-Length (SDVL) encoding on the whole extended compression packet when parsing the zero bit indication field in the time stamp field of the extended compression packet. Compression and decompression methods and apparatuses of a time stamp provided by the present invention have the following advantages over the related art:

1. being able to efficiently enhance the compression efficiency;
2. making full use of the space in the basic compression packet; and
3. optimizing the original particular processing which is made during the SDVL encoding.

PREFERRED EMBODIMENTS OF THE PRESENT INVENTION

The embodiments of the present invention will be described in detail in conjunction with accompanying drawings hereinafter.

First, the present invention plans a time stamp field in a basic compression packet and a time stamp field in an extended compression packet. In the time stamp field of the basic compression packet, a control bit (CTRLBIT) is planned to indicate an encoding mode, and the remaining bits are used to store high bits of the time stamp. In the time stamp field of the extended compression packet, a zero bit indication field is planned to indicate number information of bits of successive zeros, and the remaining bits are used to store low bits of the time stamp.

Wherein, a control bit (CTRLBIT) in the time stamp field of the basic compression packet can uses 2 bits, to indicate different encoding methods with different values. For example, setting as zero represents using a general encoding mode, and setting as non-zero representing using a particular encoding mode. As 2 bits are used, when setting as non-zero, different grouping modes of bits of successive zeros can be represented by different values of non-zero, for example, 01, 10 and 11 can be used to represent each group with 1 bit of zero, each group with 2 bits of zeros, and each group with 3 bits of zeros respectively.

An embodiment of the present invention specifically describes a compression processing for a time stamp according to the present invention by example of using 2 bits as a control bit (CTRLBIT).

Figure 3A:
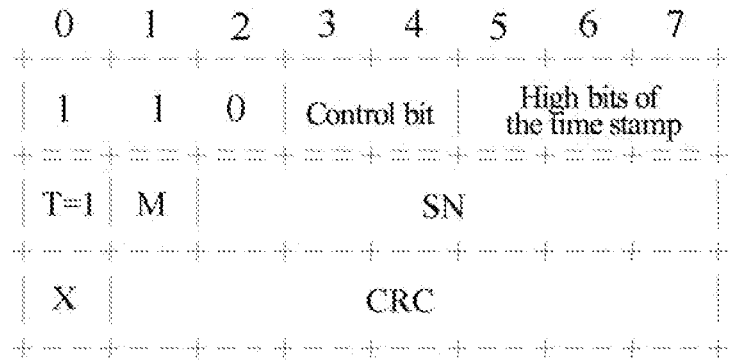
FIGS. 3a and 3b are diagrams of the format of the compression packets which are used when encoding a time stamp according to an embodiment of the present invention.
Figure 3B:
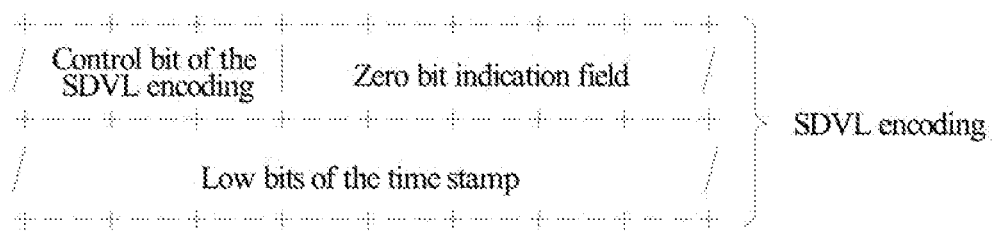

First, with respect to FIGS. 3a and 3b, wherein,

FIG. 3a illustrates a format of a basic compression packet according to an embodiment of the present invention, wherein, the basic compression packet comprises a format indication identifier of the basic compression packet (the value of the identifier is 110 in this figure), a control bit (CTRLBIT), high bits of a time stamp, a format field of an extended compression packet (T), a particular marked bit (M), a Serial Number (SN), an indication identifier used to indicate whether there is an extended compression packet (X), and a Check Code (CRC). Wherein, the format indication identifier of the basic compression packet, the format field of the extended compression packet (T), the particular marked bit (M), the Serial Number (SN), an indication identifier used to indicate whether there is an extended compression packet (X), and a Check Code (CRC) are stipulated by the RFC3095 protocol, which will not be described in detail. Wherein, the CTRLBIT and the high bits of the time stamp together constitute the time stamp field of the basic compression packet.

FIG. 3b illustrates a format of an extended compression packet according to an embodiment of the present invention, wherein, the extended compression packet can comprise a SDVL encoding control bit (SDVLCTRL), a zero bit indication field, and low bits of the time stamp. Wherein, the zero bit indication field and the low bits of the time stamp together constitute the time stamp field of the extended compression packet.

Figure 1:
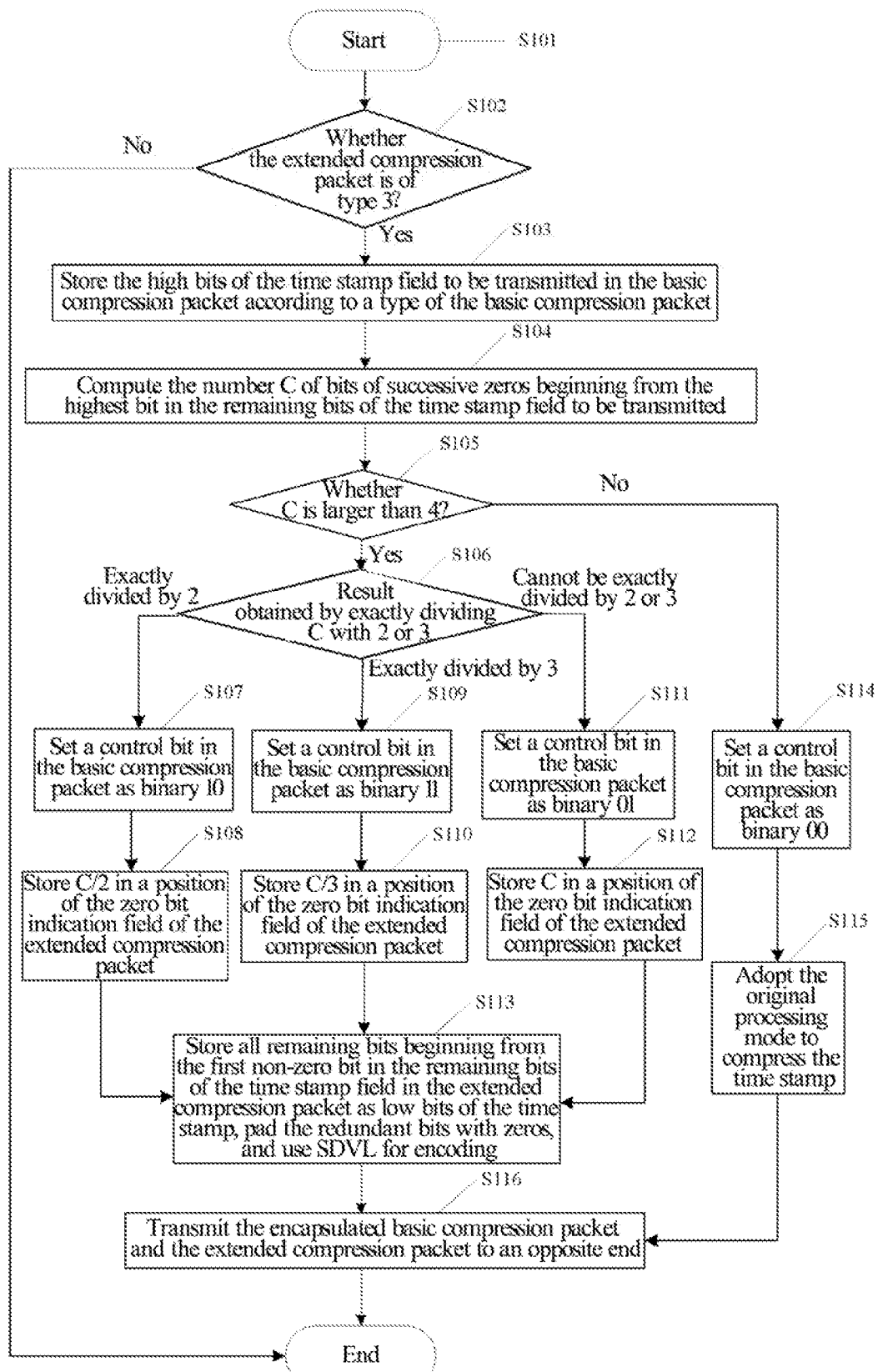
FIG. 1 is a flowchart of a compression method of a time stamp according to an embodiment of the present invention.

In the following, assume that the CTRLBIT being 00 represents using a general encoding mode, the CTRLBIT being non-zero represents a particular encoding mode, and the particular encoding mode is divided into three types according to different grouping modes of the bits of successive zeros, wherein, 01 represents each group with 1 bit of zero, 10 represents each group with 2 bits of zeros and 11 represents each group with three bits of zeros. In conjunction with FIGS. 3a and 3b, a compression method according to an embodiment of the present invention will be described in detail. As shown in FIG. 1, the compression method comprises the following steps.

In step S101, a compressor completes the processing for the time stamp field, and starts to encapsulate the time stamp field into a compression packet for transmission.

In step S102, the compressor determines whether the extended compression packet is of a type 3 according to a previously determined type of the compression packet, and if the determination result is "yes", enter Step S103, and if the determination result is "no", end the process.

In step S103, the compressor determines high bits of the time stamp to be transmitted according to the type of the basic compression packet, stores the high bits in the time stamp field of the basic compression packet, and deletes the high bits from the time stamp to be transmitted.

The compressor determining high bits of the time stamp to be transmitted according to a type of the basic compression packet refers to the compressor determining the number of bits of the time stamp field in the basic compression packet, and determining bits with a number equal to the difference value by subtracting the number of bits occupied by CTRLBIT from the number of bits of the time stamp field in the basic compression packet beginning from the highest bit in the time stamp to be transmitted as high bits of the time stamp field to be transmitted. For example, if the time stamp field in the basic compression packet has 5 bits, it is determined that the first three bits beginning from the highest bit in the time stamp field to be transmitted are high bits; and if the time stamp field in the basic compression packet is 6 bits, it is determined that the first four bits beginning from the highest bit in the time stamp field to be transmitted are high bits.

In step S104, in the remaining bits of the time stamp field to be transmitted after removing the high bits, the number C of bits of successive zeros beginning from the highest bit is computed.

In step S105, it is determined that whether the computed C is larger than the threshold of a particular encoding mode, for example 4, and if the determination result is "yes", enter step S106; otherwise, enter step S114.

The threshold of the particular encoding mode can be set according to requirements, and preferably, can be set as a value larger than 4.

In step S105, it is determined whether to use the particular encoding mode or to use the general encoding mode, and after determining to use the particular encoding mode, in the subsequent steps, it is needed to further determine the most suitable grouping way for the particular encoding mode, which is a group mode with each group having the same number of bits and the number of the groups being the minimum value for the bits of successive zeros in grouping modes (for example, each group with one bit of zero, each group with two bits of zeros, and each group with three bits of zeros) which can be indicated by the CTRLBIT In step S106, it is determined whether C can be divided exactly by 2 or 3, and if it can be divided exactly by 2, enter Step S107; if it can be divided exactly by 3, enter Step S109; and if it can neither be divided exactly by 2 nor by 3, enter Step S111.

In step S107, a control bit (CTRLBIT) in the basic compression packet (see FIG. 3a) is set as a value representing each group having 2 bits, for example 10 (binary), and enter step S108.

In step S108, C bits of zeros beginning from the highest bit in the remaining bits of the time stamp field to be transmitted are divided into groups with each having 2 bits, and the obtained group number C/2 is stored in the zero bit indication field of the extended compression packet (see FIG. 3b), and enter step S113.

In step S109, a control bit (CTRLBIT) in the basic compression packet (see FIG. 3a) is set as a value representing each group having 3 bits, for example, 11 (binary), and enter step S110.

In step S110, C bits of zeros beginning from the highest bit in the remaining bits of the time stamp field to be transmitted are divided into groups with each having 3 bits, and the obtained group number C/3 is stored in the zero bit indication field of the extended compression packet (see FIG. 3b), and enter step S113.

In step S111, a control bit (CTRLBIT) in the basic compression packet (see FIG. 3a) is set as a value representing each group having 1 bit, for example, 01 (binary), and enter step S112.

In step S112, C bits of zeros beginning from the highest bit in the remaining bits of the time stamp field to be transmitted are divided into groups with each having 1 bit, and the obtained group number C is stored in the zero bit indication field of the extended compression packet (see FIG. 3b), and enter step S113.

In step S113, the C bits of zeros beginning from the highest bit in the remaining bits of the time stamp field to be transmitted are deleted, and then the final remaining bits of the time stamp field are stored in the time stamp field of the extended compression packet, and the redundant bits in the time stamp field in the extended compression packet are padded with zeros, and the whole extended packet is performed with SDVL encoding, and enter step S116.

That is, the bits finally stored into the time stamp field of the extended compression packet are all remaining bits beginning from an initial non-zero bit in the remaining bits of the time stamp field to be transmitted after removing the high bits stored in the basic compression packet.

In step S114, a control bit (CTRLBIT) in the basic compression packet (see FIG. 3a) is set as a value representing using a general encoding mode, for example, 00 (binary), and enter step S115.

In step S115, the original processing mode is used for encoding, and enter step S116.

That is, the remaining bits of the time stamp to be transmitted after removing the high bits are stored in the time stamp field of the extended compression packet as low bits.

In step S116, the basic compression packet and the extended compression packet are transmitted to an opposite end, and the process ends.

With the above method of the present invention, a space up to 3 bytes can be saved in the extended compression packet, and the compression efficiency for the field enhances 60%.

Figure 2:
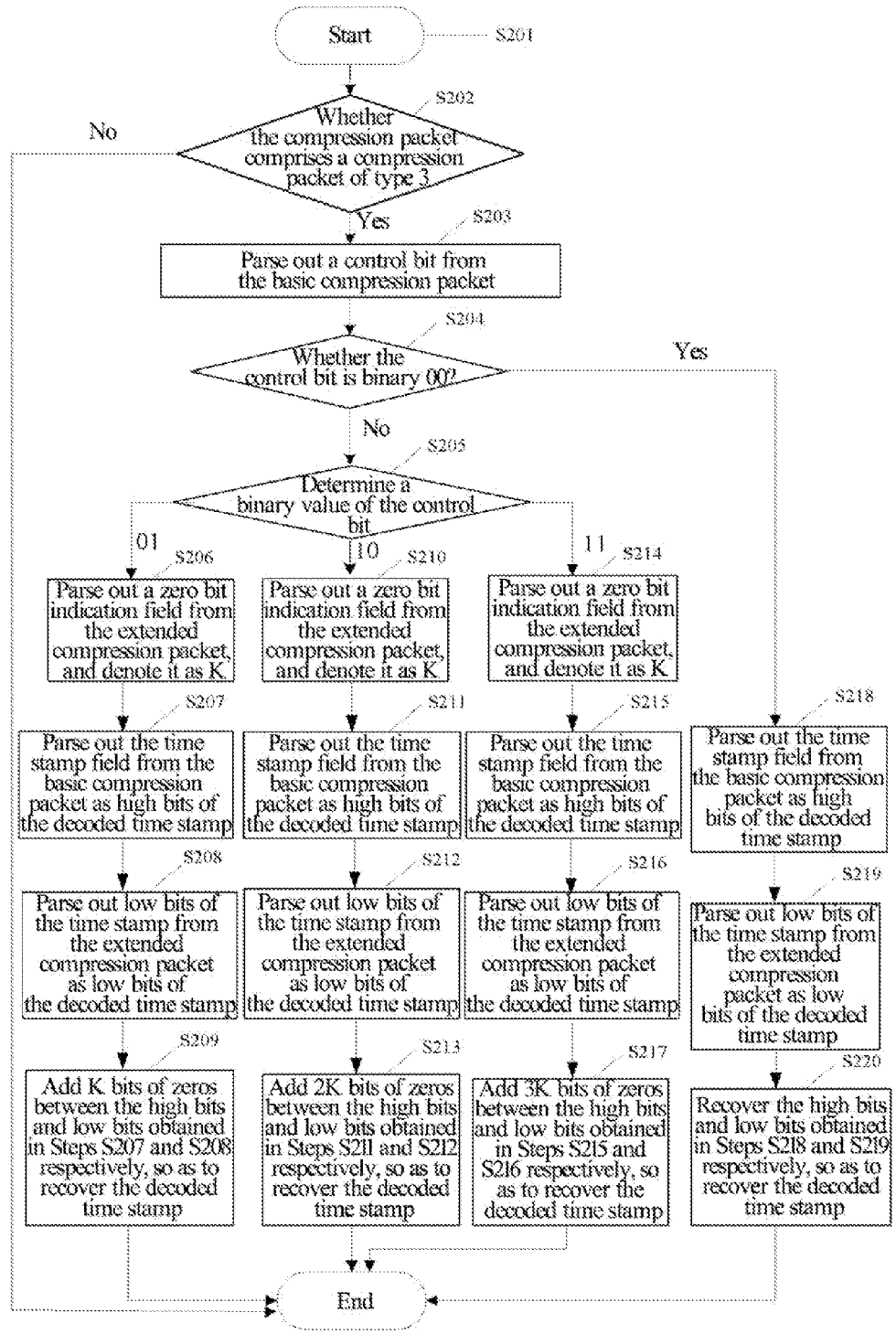
FIG. 2 is a flowchart of a decompression method of a time stamp according to an embodiment of the present invention.

For the encoding method shown in FIG. 1 of the present invention, accordingly, an embodiment of the present invention further provides a processing flowchart of encoding a time stamp, which includes the following steps as shown in FIG. 2.

In step S201, a decompressor receives a compression packet.

In step S202, it is determined whether the compression packet comprises a compression packet of type 3, and if the determination result is "yes", enter step S203; otherwise, end the process.

In step S203, a value of a control bit (CTRLBIT) in the basic compression packet (see FIG. 3a) is parsed.

In step S204, it is determined whether the control bit (CTRLBIT) is a value representing using a general encoding mode, for example 00 (binary), and if the determination result is "no", enter step S205; otherwise, enter step S218.

In step S205, it is determined a binary value of the control bit (CTRLBIT), i.e., determining a grouping mode for bits of successive zeros when using a particular encoding mode, and if the binary value is a value representing each group having 1 bit, for example, 01 (binary), enter step S206; if the binary value is a value representing each group having 2 bits, for example, 10 (binary), enter step S210; and if the binary value is a value representing each group having 3 bits, for example, 11 (binary), enter step S214.

In step S206, a zero bit indication field in the extended compression packet (see FIG. 3b) is parsed, and is denoted as K.

In step S207, high bits of the time stamp stored in the time stamp field in the basic compression packet (see FIG. 3a) are parsed as high bits of the decoded time stamp.

In step S208, low bits of the time stamp stored in the time stamp field in the extended compression packet (see FIG. 3b) are parsed as low bits of the decoded time stamp.

When the zero bit indication field in the time stamp field of the extended compression packet is parsed, it is needed to perform SDVL decoding on the whole extended compression packet firstly.

In step S209, K bits of zeros are padded between the high bits of the decoded time stamp which are obtained by step S207 and the low bits of the decoded time stamp which are obtained by step S208, so as to recover the decoded time stamp, and end the process.

In step S210, the zero bit indication field in the extended compression packet (see FIG. 3b) is parsed, and is denoted as K.

In step S211, high bits of the time stamp stored in the time stamp field in the basic compression packet (see FIG. 3a) are parsed as high bits of the decoded time stamp.

In step S212, low bits of the time stamp stored in the time stamp field in the extended compression packet (see FIG. 3b) are parsed as low bits of the decoded time stamp.

When the zero bit indication field in the time stamp field of the extended compression packet is parsed, it is needed to perform SDVL decoding on the whole extended compression packet.

In step S213, 2K bits of zeros are padded between the high bits of the decoded time stamp which are obtained by step S211 and the low bits of the decoded time stamp which are obtained by step S212, so as to recover the decoded time stamp, and end the process.

In step S214, the zero bit indication field in the extended compression packet (see FIG. 3b) is parsed, and is denoted as K.

In step S215, high bits of the time stamp stored in the time stamp field in the basic compression packet (see FIG. 3a) are parsed as high bits of the decoded time stamp.

In step S216, low bits of the time stamp stored in the time stamp field in the extended compression packet (see FIG. 3b) are parsed as low bits of the decoded time stamp.

When the zero bit indication field in the time stamp field of the extended compression packet is parsed, it is needed to perform SDVL decoding on the whole extended compression packet.

In step S217, 3K bits of zeros are padded between the high bits of the decoded time stamp which are obtained by step S215 and the low bits of the decoded time stamp which are obtained by step S216, so as to recover the decoded time stamp, and end the process.

In step S218, high bits of the time stamp stored in the time stamp field in the basic compression packet (see FIG. 3a) are parsed as high bits of the decoded time stamp.

In step S219, low bits of the time stamp stored in the time stamp field in the extended compression packet (see FIG. 3b) are parsed as low bits of the decoded time stamp.

In step S220, the decoded time stamp is recovered according to the high bits of the decoded time stamp which are obtained by step S218 and the low bits of the decoded time stamp which are obtained by step S219, and end the process.

In another embodiment, it can also be the case that the control bit (CTRLBIT) in the time stamp field of the basic compression packet only uses 1 bit, to indicate the general encoding mode and the particular encoding mode with 0 or 1 respectively, without specifically indicating a grouping mode of the bits of successive zeros when a particular encoding mode is used. The number information of the bits of the successive zeros indicated by the zero bit indication field in the time stamp field of the extended compression packet is bit number information, instead of a number of groups obtained by grouping. When a planning mode of another embodiment is used, during an encoding process, the difference from the encoding method illustrted in FIG. 1 is that after counting a number C of bits of continous zeros, the number C of the bits of successive zeros is directly stored in the zero bit indication field of the extended compression packet, and does not perform a grouping processing. During decoding, the difference from the decoding method illustrated in FIG. 2 is that the zero bit indication field is extracted from the extended compression packet and is denoted as K. Here, K does not represent the number of groups obtained by grouping the bits of successive zeros, instead it is the number of the bits of successive zeros. Therefore, after obtaining the high bits and low bits of the decoded time stamp, K bits of zeros are padded between the high bits and low bits of the decoded time stamp which is obtained, so as to recover the decoded time stamp.

Figure 4:
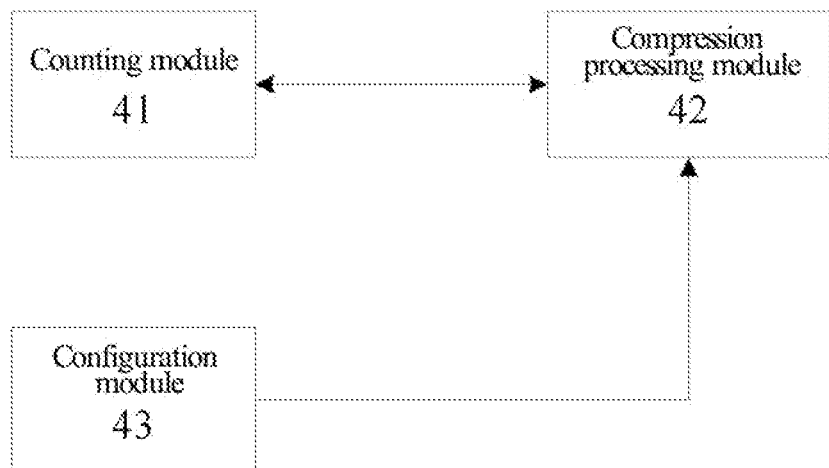
FIG. 4 is a block diagram of a compression apparatus of a time stamp according to an embodiment of the present invention.

In order to implement the above compression method, the present invention further provides a compression apparatus, which is applied in a scenario of compressing a basic compression packet carrying an extended compression packet of type 3 in Robust Header Compression (ROHC). As shown in FIG. 4, the compression apparatus comprises a counting module 41 and a compression processing module 42, wherein, the counting module 41 is configured to count the number of bits of successive zeros beginning from the highest bit of the remaining bits of the time stamp to be transmitted after removing high bits, and transmitting the number to the compression processing module 42;

the compression processing module 42 is configured to: store the high bits of the time stamp to be transmitted to the time stamp field of the basic compression packet, and store the bits of successive zeros in the zero bit indication field of the extended compression packet in a form of number information according to the number of bits of successive zeros received by the counting module 41; and store the remaining bits of the time stamp to be transmitted after removing the high bits and the bits of successive zeros as low bits in the time stamp field of the extended compression packet.

Further, the compression apparatus further comprises a configuration mode 43, which is configured to: plan a control bit (CTRLBIT) and a corresponding relationship between a value of the CTRLBIT and the encoding mode indicated by the CTRLBIT in the time stamp field of the basic compression packet; and plan a zero bit indication field in the time stamp field of the extended compression packet, wherein, the zero bit indication field is used to indicate number information of bits of successive zeros. The compression processing module 42 is configured to: after receiving the number of bits of successive zeros transmitted by the counting module 41, determine whether the number is larger than a threshold of a particular encoding mode, and if yes, set the CTRLBIT in the basic compression packet as a value indicating the particular encoding mode, and according to the number of bits of successive zeros, store bits of successive zeros in a form of number information in the zero bit indication field of the extended compression packet, and store the remaining bits of the time stamp to be transmitted after removing the high bits and the bits of successive zeros in the time stamp field of the extended compression packet as low bits; and if no, set the CTRLBIT in the basic compression packet as a value indicating a general encoding mode, and store the remaining bits of the time stamp to be transmitted after removing the high bits in the time stamp field of the extended compression packet as low bits.

Further, the configuration module 43 can configure the CTRLBIT in the time stamp field of the basic compression packet to be represented in a form of 2 bits, to indicate, in addition to the general encoding mode and the particular encoding mode, a grouping mode used for the bits of successive zeros when indicating the particular encoding mode; and configure the number information of the bits of successive zeros indicated in the zero bit indication field in the time stamp field of the extended compression packet to be group number information. The compression processing module 42 is configured to: after determining that the number of bits of successive zeros transmitted by the counting module 41 is larger than the threshold of the particular encoding mode, further determine a grouping mode of each group with the same number of bits and the number of the groups being a minimum number for the bits of successive zeros in grouping modes which can be indicated by the CTRLBIT, set the CTRLBIT as a value representing the determined grouping mode; and store a group number obtained by grouping the bits of successive zeros according to the grouping mode in the zero bit indication field of the extended compression packet.

Further, the grouping mode configured by the configuration module 43 can comprise each group with 1 bit of zero, each group with 2 bits of zeros, and each group with three bits of zeros.

Further, the configuration module 43 can configure the CTRLBIT in the time stamp field of the basic compression packet to be represented in a form of 1 bit, to indicate the general encoding mode and the particular encoding mode with 0 or 1 respectively; the number information of the bits of successive zeros indicated by the zero bit indication field in the time stamp field of the extended compression packet is bit number information. The compression processing module 42 is configured to set the CTRLBIT as a value indicating a particular encoding mode and directly store the number of bits of successive zeros in the zero bit indication field of the extended compression packet after determining that the number of bits of successive zeros beginning from the highest bit in the remaining bits of the time stamp to be transmitted after removing the high bits is larger than a threshold of the particular encoding mode.

Further, the compression processing module 42 is configured to use bits with a number equal to the difference value by subtracting the number of bits occupied by CTRLBIT from the number of bits of the time stamp field in the basic compression packet beginning from the highest bit in the time stamp to be transmitted as high bits of the time stamp field to be transmitted when storing high bits of a time stamp to be transmitted in a time stamp field of the basic compression packet.

Further, the compression processing module 42 is configured to pad the unoccupied bits in the time stamp field of the extended compression packet with zeros and then use Self-Describing Variable-Length (SDVL) encoding for the whole extended compression packet after storing the low bits of the time stamp to be transmitted in the time stamp field of the extended compression packet.

Figure 5:
FIG. 5 is a block diagram of a decompression apparatus of a time stamp according to an embodiment of the present invention.

In order to implement the above decompression method, the present invention further provides a decompression apparatus, which is applied in a scenario of decompressing a basic compression packet carrying an extended compression packet of type 3 in Robust Header Compression (ROHC). As shown in FIG. 5, the decompression apparatus comprises a configuration module 51 and a decompression processing module 52, wherein, the configuration module 51 is configured to: plan a control bit (CTRLBIT) and a corresponding relationship between a value of the CTRLBIT and the encoding mode indicated by the CTRLBIT in the time stamp field of the basic compression packet; and plan a zero bit indication field in the time stamp field of the extended compression packet, wherein, the zero bit indication field is used to indicate number information of bits of successive zeros;

the decompression processing module 52 is configured to: parse and determine the CTRLBIT in the time stamp field of the basic compression packet according to the configuration of the configuration module 51, if a value of the CTRLBIT is a value indicating a particular encoding mode, parse a zero bit indication field in the time stamp field of the extended compression packet, accordingly obtain the number of bits of successive zeros, parse the stored bits of the time stamp from the time stamp field of the basic compression packet as high bits, parse the stored bits of the time stamp from the time stamp field of the extended compression packet as low bits, pad bits of zeros with a number equal to the number of the bits of successive zeros between the high bits and the low bits, so as to obtain the time stamp which is finally decompressed; and if the value of the CTRLBIT is a value indicating a general encoding mode, parse the bits of the stored time stamp from the time stamp field of the basic compression packet as high bits, and parse bits of the stored time stamp from the time stamp field of the extended compression packet as low bits, so as to obtain the time stamp which is finally decompressed.

Further, the configuration apparatus 51 is configured to: configure the CTRLBIT in the time stamp field of the basic compression packet to be represented in a form of 2 bits, to indicate, in addition to the general encoding mode and the particular encoding mode, a grouping mode used for the bits of continues zeros when indicating the particular encoding mode; and configure the number information of the bits of successive zeros indicated by the zero bit indication field in the time stamp field of the extended compression packet to be group number information. The decompression processing module 52 is configured to, after determining that the value of the CTRLBIT is a value indicating the particular encoding mode, further determine a grouping mode indicated by the value of the CTRLBIT, parse the zero bit indication field in the time stamp field of the extended compression packet to obtain group number information, and compute the number of bits of successive zeros according to the grouping mode and the group number information.

Further, the grouping mode comprises each group with 1 bit of zero, each group with 2 bits of zeros, and each group with three bits of zeros. The decompression processing module 52 computing the number of the bits of successive zeros according to the grouping mode and the group number information refers to computing a product of the number of bits of zeros included in each group and the group number.

Further, the configuration module 51 is configured to: configure the CTRLBIT in the time stamp field of the basic compression packet to be represented in a form of 1 bit, to indicate the general encoding mode and the particular encoding mode with 0 or 1 respectively; the number information of the bits of successive zeros indicated by the zero bit indication field in the time stamp field of the extended compression field is bit number information. The decompression processing module 52 is configured to, after determining that the value of the CTRLBIT is a value indicating the particular encoding mode, parse the zero bit indication field in the time stamp field of the extended compression packet, and the obtained value is the number of the bits of the successive zeros.

Further, the decompression processing module 52 needs to perform Self-Describing Variable-Length (SDVL) decoding on the whole extended compression packet when parsing the zero bit indication field in the time stamp field of the extended compression packet.

The above description is only the preferred embodiments of the present invention and is not intended to limit the present invention. For those skilled in the art, the invention can have various modifications and variations. Any of modification, equivalent and improvement etc., which is made within the spirit and principle of the present invention, should be contained within the protection scope of the present invention.

INDUSTRIAL APPLICABILITY

Compression and decompression methods and apparatuses of a time stamp provided by the present invention have the following advantages over the related art:
1. being able to efficiently enhance the compression efficiency;
2. making full use of the space in the basic compression packet; and
3. optimizing the original particular processing which is made during the SDVL encoding.

What is claimed is:
1. A method for compressing a time stamp, applied in a scenario of compressing a basic compression packet carrying an extended compression packet of type 3 in Robust Header Compression (ROHC), the method comprising:
  pre-setting a control bit (CTRLBIT) in a time stamp field of the basic compression packet to indicate an encoding mode; and
  setting a zero bit indication field in a time stamp field of the extended compression packet to indicate number information of bits of successive zeros;
  storing high bits of the time stamp to be transmitted in the time stamp field of the basic compression packet;
  counting and determining whether the number information is larger than a threshold of a particular encoding mode;
  if the number information is larger than the threshold, setting the CTRLBIT as a value indicating the particular encoding mode, storing the bits of successive zeros beginning from the highest bit of remaining bits of the time stamp to be transmitted after removing high bits in the zero bit indication field of the extended compression packet in a form of the number information, and storing remaining bits of the time stamp to be transmitted after removing the high bits and the bits of successive zeros in the time stamp field of the extended compression packet as low bits;
  if the number information is not larger than the threshold, setting the CTRLBIT as a value indicating a general encoding mode, and storing the remaining bits of the time stamp to be transmitted after removing the high bits in the time stamp field of the extended compression packet as low bits;
  wherein the CTRLBIT is in a form of 2 bits, to indicate the general encoding mode and the particular encoding mode, and to further indicate a grouping mode for the bits of successive zeros when indicating the particular encoding mode;
  the number information of the bits of successive zeros indicated by the zero bit indication field is group number information;
  after determining that the number information is larger than the threshold of the particular encoding mode, the method further comprises:
  determining the grouping mode for the particular encoding mode, and setting the CTRLBIT as a value representing the determined grouping mode; and the grouping mode is a mode, among grouping modes indicated by the CTRLBIT, of which each group has the same number of bits and the number of the groups is a minimum value for the bits of successive zeros, and
  storing the bits of successive zeros in a form of number information is storing a group number obtained by grouping the bits of successive zeros according to the grouping mode in the zero bit indication field of the extended compression packet.

2. The method according to claim 1, wherein,
the grouping mode comprises each group with 1 bit of zero, each group with 2 bits of zeros, and each group with three bits of zeros.

3. The method according to claim 1, wherein,
the CTRLBIT is in a form of 1 bit, to indicate the general encoding mode and the particular encoding mode with 0 or 1 respectively;
the number information of the bits of successive zeros indicated by the zero bit indication field is bit number information;
after determining that the number information is larger than the threshold of the particular encoding mode, the method further comprises: setting the CTRLBIT as a value representing the particular encoding mode;
storing in a form of number information is directly storing the number of the bits of successive zeros in the zero bit indication field of the extended compression packet.

4. The method according to claim 1, wherein,
storing the high bits of the time stamp to be transmitted in the time stamp field of the basic compression packet is specifically performed as that: using the bits in the time stamp field to be transmitted with a number equal to the number of bits of the time stamp field in the basic compression packet beginning from the highest bit minus the number of bits occupied by the CTRLBIT as high bits of the time stamp field to be transmitted.

5. A method for decompressing a time stamp, applied in a scenario of decompressing a basic compression packet carrying an extended compression packet of type 3 in Robust Header Compression (ROHC), the method comprising:
  setting a control bit (CTRLBIT) in a time stamp field of the basic compression packet, to indicate an encoding mode; and setting a zero bit indication field in a time stamp field of the extended compression packet, to indicate number information of bits of successive zeros;
  parsing and determining the CTRLBIT in the time stamp field of the basic compression packet when decompressing the compression packet,
  if a value of the CTRLBIT is a value indicating a particular encoding mode, parsing the zero bit indication field in the time stamp field of the extended compression packet and accordingly obtaining the number of bits of successive zeros, parsing out the stored bits of the time stamp from the time stamp field of the basic compression packet as high bits, parsing out the stored bits of the time stamp from the time stamp field of the extended compression packet as low bits, padding bits of zeros with a number equal to the number of the bits of successive zeros between the high bits and the low bits, so as to obtain a time stamp which is finally obtained by decompression; and if the value of the CTRLBIT is a value indicating a general encoding mode, parsing out the stored bits of the time stamp from the time stamp field of the basic compression packet as high bits, and parsing out the stored bits of the time stamp from the time stamp field of the extended compression packet as low bits, so as to obtain the time stamp which is finally obtained by decompression;

the CTRLBIT is in a form of 2 bits, to indicate the general encoding mode and the particular encoding mode, and to further indicate a grouping mode for the bits of successive zeros when indicating the particular encoding mode;

the number information of the bits of successive zeros indicated by the zero bit indication field is group number information;

after determining that the value of the CTRLBIT is a value indicating the particular encoding mode, the method further comprises: determining a grouping mode indicated by the value of the CTRLBIT, parsing the zero bit indication field in the time stamp field of the extended compression packet to obtain group number information, and computing the number of the bits of successive zeros according to the grouping mode and the group number information.

6. The method according to claim 5, wherein, the grouping mode comprises each group with 1 bit of zero, each group with 2 bits of zeros, and each group with three bits of zeros; and computing the number of the bits of successive zeros according to the grouping mode and the group number information refers to computing a product of the number of bits of zeros included in each group and the group number.

7. The method according to claim 5, wherein, the CTRLBIT is in a form of 1 bit, to indicate the general encoding mode and the particular encoding mode with 0 or 1 respectively;

the number information of the bits of successive zeros indicated by the zero bit indication field is bit number information;

the value obtained by parsing the zero bit indication field in the time stamp field of the extended compression packet when the value of the CTRLBIT is the value indicating the particular encoding mode is the number of the bits of the successive zeros.

8. An apparatus for compressing a time stamp, applied in a scenario of compressing a basic compression packet carrying an extended compression packet of type 3 in Robust Header Compression (ROHC), the apparatus comprising a configuration module, a counting module and a compression processing module, wherein, the configuration module is configured to set a control bit (CTRLBIT) and a corresponding relationship between a value of the CTRLBIT and an encoding mode indicated by the CTRLBIT in a time stamp field of the basic compression packet; and set a zero bit indication field in a time stamp field of the extended compression packet, wherein, the zero bit indication field is used to indicate number information of bits of successive zeros;

the counting module is configured to count the number of bits of successive zeros beginning from the highest bit of remaining bits of a time stamp to be transmitted after removing high bits, and transmitting the number of bits to the compression processing module;

the compression processing module is configured to:

store the high bits of the time stamp to be transmitted to the time stamp field of the basic compression packet;

after receiving the number of bits of successive zeros transmitted by the counting module, determine whether the number of bits is larger than a threshold of a particular encoding mode, if the number of bits is larger than the threshold, set the CTRLBIT as a value indicating the particular encoding mode, and store the bits of successive zeros in the zero bit indication field of the extended compression packet in a form of the number information according to the number of bits received by the counting module, and store remaining bits of the time stamp to be transmitted after removing the high bits and the bits of successive zeros as low bits in the time stamp field of the extended compression packet; if the number of bits is not larger than the threshold, set the CTRLBIT as a value indicating a general encoding mode, and storing the remaining bits of the time stamp to be transmitted after removing the high bits in the time stamp field of the extended compression packet as the low bits;

wherein the configuration module is further configured to:

configure the CTRLBIT to be represented in a form of 2 bits, to indicate the general encoding mode and the particular encoding mode, and to further indicate a grouping mode for the bits of successive zeros when indicating the particular encoding mode; and configure the number information of the bits of successive zeros indicated by the zero bit indication field to be group number information;

the compression processing module is further configured to:

after determining that the number of bits is larger than the threshold of the particular encoding mode, determine a grouping mode indicated by the CTRLBIT, and setting the CTRLBIT to represent a value of the determined grouping mode; and the grouping mode is a mode of each group with the same number of bits and the number of the groups with a minimum for the bits of successive zeros, and store the number of groups obtained by grouping the bits of successive zeros according to the grouping mode in the zero bit indication field of the extended compression packet.

9. The apparatus according to claim 8, wherein, the grouping mode configured by the configuration module comprises each group with 1 bit of zero, each group with 2 bits of zeros, and each group with three bits of zeros.

10. The apparatus according to claim 8, wherein, the configuration module is configured to configure the CTRLBIT to be represented in a form of 1 bit, to indicate the general encoding mode and the particular encoding mode with 0 or 1 respectively; the number information of the bits of successive zeros indicated by the zero bit indication field is bit number information.

11. The apparatus according to claim 8, wherein, the compression processing module is configured to use the bits in the time stamp field to be transmitted with a number equal to the number of bits of the time stamp field in the basic compression packet beginning from the highest bit minus the number of bits occupied by the CTRLBIT as high bits of the time stamp field to be transmitted, when storing the high bits of the time stamp to be transmitted in the time stamp field of the basic compression packet.

12. An apparatus for decompressing a time stamp, applied in a scenario of decompressing a basic compression packet carrying an extended compression packet of type 3 in Robust Header Compression (ROHC), the apparatus comprising a configuration module and a decompression processing module, wherein, the configuration module is configured to:
set a control bit (CTRLBIT) and a corresponding relationship between a value of the CTRLBIT and an encoding mode indicated by the CTRLBIT in a time stamp field of the basic compression packet; and
set a zero bit indication field in the time stamp field of the extended compression packet, wherein, the zero bit indication field is used to indicate number information of bits of successive zeros;
the decompression processing module is configured to:
parse and determine the CTRLBIT in the time stamp field of the basic compression packet according to configuration in the configuration module,
if a value of the CTRLBIT is a value indicating a particular encoding mode, parse a zero bit indication field in the time stamp field of the extended compression packet and accordingly obtain the number of the bits of successive zeros, parse out the stored bits of the time stamp from the time stamp field of the basic compression packet as high bits, parse out the stored bits of the time stamp from the time stamp field of the extended compression packet as low bits, pad bits of zeros with a number equal to the number of the bits of successive zeros between the high bits and the low bits, so as to obtain a time stamp which is finally obtained by decompression; and
if the value of the CTRLBIT is a value indicating a general encoding mode, parse out the stored bits of the time stamp from the time stamp field of the basic compression packet as high bits, and parse out the stored bits of the time stamp from the time stamp field of the extended compression packet as low bits, so as to obtain the time stamp which is finally obtained by decompression;

the configuration apparatus is further configured to:
configure the CTRLBIT to be represented in a form of 2 bits, to indicate the general encoding mode and the particular encoding mode, and to further indicate a grouping mode for the bits of successive zeros when indicating the particular encoding mode; and
configure the number information of the bits of successive zeros indicated by the zero bit indication field to be group number information;
the decompression processing module is further configured to, after determining that the value of the CTRLBIT is a value indicating the particular encoding mode, determine a grouping mode indicated by the value of the CTRLBIT, parse the zero bit indication field in the time stamp field of the extended compression packet to obtain group number information, and compute the number of bits of successive zeros according to the grouping mode and the group number information.

13. The apparatus according to claim 12, wherein,
the grouping mode comprises each group with 1 bit of zero, each group with 2 bits of zeros, and each group with three bits of zeros; and
the decompression processing module is configured to compute a product of the number of bits of zeros included in each group and the group number when computing the number of bits of successive zeros according to the grouping mode and the group number information.

14. The apparatus according to claim 12, wherein,
the configuration module is further configured to:
configure the CTRLBIT to be represented in a form of 1 bit, to indicate the general encoding mode and the particular encoding mode with 0 or 1 respectively; the number information of the bits of successive zeros indicated by the zero bit indication field is bit number information;
the decompression processing module is configured to, after determining that the value of the CTRLBIT is a value indicating the particular encoding mode, parse the zero bit indication field in the time stamp field of the extended compression packet to obtain a value, and the value is the number of the bits of the successive zero.

* * * * *